US012586912B2

(12) United States Patent
Buckley

(10) Patent No.: US 12,586,912 B2
(45) Date of Patent: Mar. 24, 2026

(54) NON-EQUILATERAL TRIANGULAR GRID RADIATING ELEMENT AND ARRAY OF SAME

(71) Applicant: Hughes Network Systems, LLC, Germantown, MD (US)

(72) Inventor: Michael Buckley, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 281 days.

(21) Appl. No.: 18/306,805

(22) Filed: Apr. 25, 2023

(65) Prior Publication Data

US 2023/0344134 A1 Oct. 26, 2023

Related U.S. Application Data

(60) Provisional application No. 63/335,199, filed on Apr. 26, 2022.

(51) Int. Cl.
*H01Q 9/04* (2006.01)
*H01Q 15/08* (2006.01)

(52) U.S. Cl.
CPC ........... *H01Q 9/0485* (2013.01); *H01Q 15/08* (2013.01)

(58) Field of Classification Search
CPC .... H01Q 9/0485; H01Q 15/08; H01Q 9/0414; H01Q 21/24; H01Q 21/06; H01Q 1/38
See application file for complete search history.

(56) References Cited

U.S. PATENT DOCUMENTS

| | | | | |
|---|---|---|---|---|
| 8,354,972 B2 * | 1/2013 | Borja | H01Q 1/38 343/815 |
| 8,872,713 B1 * | 10/2014 | Buckley | H01Q 15/0086 343/767 |
| 9,825,372 B1 | 11/2017 | Buckley | |
| 2018/0219296 A1 * | 8/2018 | Chi | H01Q 1/38 |
| 2019/0115643 A1 * | 4/2019 | Khan | H01Q 9/42 |
| 2021/0028553 A1 | 1/2021 | Buckley et al. | |
| 2021/0143548 A1 * | 5/2021 | Chivukula | H01Q 1/48 |
| 2021/0242592 A1 * | 8/2021 | Yoon | H01Q 5/40 |
| 2021/0265737 A1 | 8/2021 | Buckley et al. | |
| 2023/0299506 A1 * | 9/2023 | Park | H01Q 21/28 343/702 |

OTHER PUBLICATIONS

International Search Report for International Application No. PCT/US2023/066207.

Michael J Buckley et al: "Higher Order Floquet Mode Radiating Elements (HOFS) in Low Cost Phased Arrays Active Element Pattern E Plane C Sandwich Radome TM (Parallel) Polarization Return Loss", Dec. 16, 2016 (Dec. 16, 2016), XP055749811, Retrieved from the Internet: URL:https://www.slideshare.net/MichaelBuckley57/higher-order-floquet-mode-radiatingelements-70219775 [retrieved on Nov. 12, 2020] pp. 27-29.

* cited by examiner

*Primary Examiner* — Hai V Tran
(74) *Attorney, Agent, or Firm* — Capitol City TechLaw; Jasbir Singh

(57) ABSTRACT

A radiating element including: Higher order Floquet Structure (HOFS) layers comprising a top PCB metal layer, a mid PCB metal layer, and a low PCB metal layer; component layers comprising electronics to connect to the HOFS layers; and a unit cell constructively defined by the HOFS layers, wherein the unit cell is capable of operating as a transceiver, the unit cell has an operating range of 10.7 GHz to 14.5 GHz, and an area of the unit cell is $0.3125\lambda^2$.

20 Claims, 4 Drawing Sheets

NON-EQUILATERAL TRIANGULAR GRID RADIATING ELEMENT AND ARRAY OF SAME

REFERENCE

The present application claims the benefit under 35 U.S.C. 119(e) of U.S. Provisional Application Ser. No. 63/335,199, filed Apr. 26, 2022, which is incorporated herein by reference in its entirety.

FIELD

The present teachings are directed generally toward a wide scan aperture coupled dual polarized radiating element with a large unit cell size in a non-equilateral triangular grid array. The non-equilateral triangular grid array may reduce E plane surface wave interaction. The unit cells may be sized as a $0.3125\lambda^2$. The radiating element may be used in antennas, and more particularly in electronically scanned antennas.

BACKGROUND

The unit cell of the prior art radiating elements are small relative to their wavelength size, for example, no more than $0.25\lambda^2$ sized.

Prior art radiating elements are generally not symmetrical, vertically or horizontally, when disposed in a triangular grid array. The symmetric array results in better surface wave suppression for an antenna. The symmetric array scans easily to 45 degrees and performs better than an array of $0.25\lambda^2$ radiating elements.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

For a given array size (area), a larger number of the $0.25\lambda^2$ sized radiating elements are required to form the array as compared to an array manufactured with the $0.3125\lambda^2$ sized radiating elements of the present teachings. The larger number of Radiating elements translates to complex wiring, heat load, more room for error and higher manufacturing costs. For example, using the $0.3125\lambda^2$ sized radiating elements results in a 20% reduction in a count of radiating elements needed to obtain a similar array area when using $0.25\lambda^2$ sized radiating elements, namely, 1024 vs 1280.

In some aspects, the techniques described herein relate to a radiating element including: Higher order Floquet Structure (HOFS) layers comprising a top PCB metal layer, a mid PCB metal layer, and a low PCB metal layer; component layers comprising electronics to connect to the HOFS layers; and a unit cell constructively defined by the HOFS layers, wherein the unit cell is capable of operating as a transceiver, the unit cell has an operating range of 10.7 GHz to 14.5 GHz, and an area of the unit cell is $0.3125\lambda^2$.

In some aspects, the techniques described herein relate to a radiating element, wherein each of the HOFS layers comprises a metal layer comprising a feature trace and gap widths of about 6 mils or greater.

In some aspects, the techniques described herein relate to a radiating element, wherein each of the HOFS layers comprises a substrate having a dielectric constant ranging from 3.0 to 3.7.

In some aspects, the techniques described herein relate to a radiating element, wherein the substrate comprises a Rogers 4835 material.

In some aspects, the techniques described herein relate to a radiating element, wherein the substrate includes a polycarbonate or a low-loss FR-4 material.

In some aspects, the techniques described herein relate to a radiating element, wherein the component layers and the HOFS layers are affixed to each other with an adhesive.

In some aspects, the techniques described herein relate to a radiating element, wherein the unit cell is configured to operate with a scan angle θ from 0° to 50° and a φ scan angle from 0° and 360°.

In some aspects, the techniques described herein relate to a radiating element, wherein the component layers and the HOFS layers jointly have a cross-section depth between 100 mils and 450 mils.

In some aspects, the techniques described herein relate to a radiating element, wherein the unit cell comprises a plurality of unit cells disposed in a non-equilateral triangular lattice.

In some aspects, the techniques described herein relate to a radiating element, wherein the plurality of unit cells are formed by symmetrical metal layers about a vertical axis and a horizontal axis, and the symmetrical metal layers constructively form the non-equilateral triangular lattice.

In some aspects, the techniques described herein relate to a radiating element, wherein each of the plurality of unit cells is configured to operate with a scan angle θ from 0° to 50° and a φ scan angle from 0° and 360°.

In some aspects, the techniques described herein relate to a radiating element, wherein each of the HOFS layers comprises a substrate having a dielectric constant ranging from 3.0 to 3.7.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
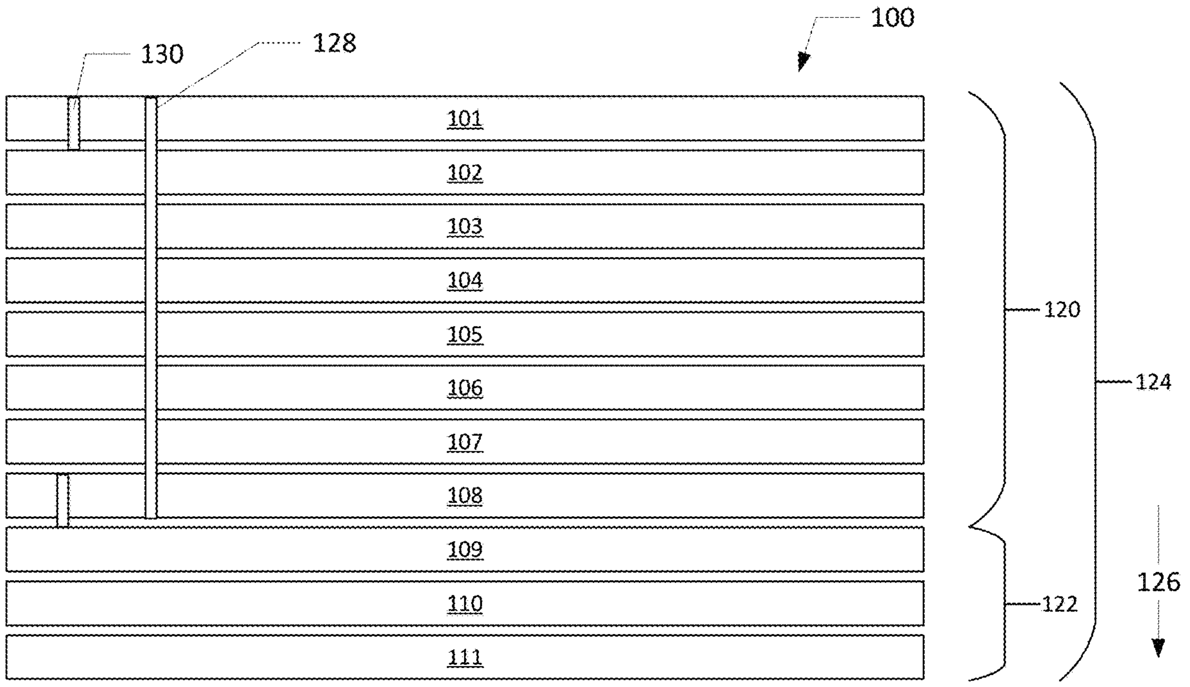
FIG. 1 illustrates a cross-sectional side view of a Printed Circuit Board (PCB) including component layers and HOFS layers of the PCB according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

For a given array size (area), a larger number of the $0.25\lambda^2$ sized radiating elements are required to form the array as compared to an array manufactured with the $0.3125\lambda^2$ sized radiating elements of the present teachings. The larger number of Radiating elements translates to complex wiring, heat load, more room for error and higher manufacturing costs. For example, using the $0.3125\lambda^2$ sized radiating elements results in a 20% reduction in a count of radiating elements needed to obtain a similar array area when using $0.25\lambda^2$ sized radiating elements, namely, 1024 vs 1280.

In some embodiments, a scannable antenna array operates across a frequency range 10.7 GHz-14.5 GHz. In some embodiments, the array operates across a wide half conical scan angle spanning 0-50 degrees.

In some embodiments, a return loss <−10 dB to 45 degrees may be observed.

In some embodiments, the array may have a Total stack height of about less than 100 mils, less than 200 mils, less than 290 mils.

FIG. 1 illustrates a cross-sectional side view of a Printed Circuit Board (PCB) including component layers and HOFS layers of the PCB according to various embodiments.

Referring to FIG. 1, a PCB 100 includes component layers 120 and a higher order Floquet-mode structure (HOFS) layers 122. The component layers 120 may include component layers 101, 102, 103, 104, 105, 106, 107 and 108. The component layers 120 may support various electronics (not shown) to drive HOFS radiating elements formed by the HOFS layers 122. The component layers 120 may couple/connect with the HOFS layers 122 via apertures. In some embodiments, the component layers 120 couple/connect with the HOFS layers 122 via a line.

The HOFS layers 122 may include a low PCB metal layer 109, a mid PCB metal layer 110 and a top PCB metal layer 111. Direction 126 illustrates both the direction from which radio frequency waves are to be received from and the direction in which radio frequency waves are transmitted to by radiating elements (not shown) disposed in an array (not shown) on the PCB 100.

The component layers 101, 102, 103, 104, 105, 106, 107 and 108 may include ground layers, signal layers, plane layers. Each of the component layers 101, 102, 103, 104, 105, 106, 107 and 108 may include printed circuit patterns. In some embodiments, a thickness of each of the component layers 101, 102, 103, 104, 105, 106, 107 and 108 may range from 1 mil to 20 mils, for example, 10 mil, 5 mil, 3.5 mil. The component layers 101, 102, 103, 104, 105, 106, 107 and 108 may be formed from a combination of Speedwave 300P material, Rogers 4835 5TC/5TC material, or the like.

Embodiments are directed specifically toward materials to form substrates for the low PCB metal layer 109, mid PCB metal layer 110 and top PCB metal layer 111 with a dielectric constant of between 3.0 and 3.7, though a person of ordinary skill in the art having the benefit of the disclosure may appreciate that other dielectric constants are envisioned.

The low PCB metal layer 109, mid PCB metal layer 110 and top PCB metal layer 111 may include a substrate of a high dielectric constant material such as FR-4 material, for example, Rogers 4835 or the like. FR-4 (Flame Retardant 4) is a NEMA grade designation for glass-reinforced epoxy laminate material. FR-4 is a composite material composed of woven fiberglass cloth with an epoxy resin binder that is flame resistant (self-extinguishing). With near zero water absorption, FR-4 is most commonly used as an electrical insulator possessing considerable mechanical strength. Herein, high dielectric constant may be understood to refer generally to a dielectric greater than 3.0. The dielectric constant of the low PCB metal layer 109, mid PCB metal layer 110 and top PCB metal layer 111 may range from 3.0 to 3.7, range from 3.4 to 3.6, or be about 3.48.

In some embodiments, a RX aperture 130 may be provided thru one or component layers, for example, component layers 101 and 108. A position of the RX aperture 130 may correspond to a RX coupling portion (for example, metal layer 202 of FIG. 2A) of a top PCB metal layer 111.

In some embodiments, a TX aperture 128 may be provided thru one or component layers, for example, component layers 101, 102, 103, 104, 105, 106, 107 and 108. A position of the TX aperture 128 may correspond to a TX coupling portion (for example, metal layer 222 of FIG. 2C) of a low PCB metal layer 109.

In some embodiments, an electronically scanned antenna including a plurality of the radiating elements disposed in a non-equilateral triangle grid array (see FIG. 4) may be implemented with the PCB 100. A cross-section depth of the PCB 100 may be less than 300 mils, less than 200 mils, less than 100 mils, or the like. The PCB 100 may be implemented as a printed circuit board (PCB) stack.

A thickness of each the low PCB metal layer 109, mid PCB metal layer 110 and top PCB metal layer 111 may vary, for example, greater than or equal to 5 mils, greater than or equal to 10 mils, greater than or equal to 20 mils or the like. The low PCB metal layer 109, mid PCB metal layer 110 and top PCB metal layer 111 may be printed on either a top surface or the bottom surface (perspective defined per FIG. 1) of each of the low PCB metal layer 109, mid PCB metal layer 110 and top PCB metal layer 111. Patterns of metal formed on the low PCB metal layer 109, mid PCB metal layer 110 and top PCB metal layer 111 may be different. The low PCB metal layer 109, mid PCB metal layer 110 and top PCB metal layer 111 may use a feature trace and gap widths of about 10 mils or greater. The low PCB metal layer 109, mid PCB metal layer 110 and top PCB metal layer 111 may use line widths of 6 mils or greater. The low PCB metal layer 109, mid PCB metal layer 110 and top PCB metal layer 111 may use gaps between metal lines having a width of 10 mils or greater. The printing of the low PCB metal layer 109, mid PCB metal layer 110 and top PCB metal layer 111 may be done by a variety of metal printing techniques known in the art. The metal on each of the low PCB metal layer 109, mid PCB metal layer 110 and top PCB metal layer 111 may be formed of a material composition of high conductivity, such as copper, conductive ink, or the like. A thickness of the metal on each of the low PCB metal layer 109, mid PCB metal layer 110 and top PCB metal layer 111 may be effectively zero mils. The PCB 100 may include additional substrates and metal layers. An adhesive (not shown) may be disposed between each of the layers to form the PCB 100.

Figure 2A:
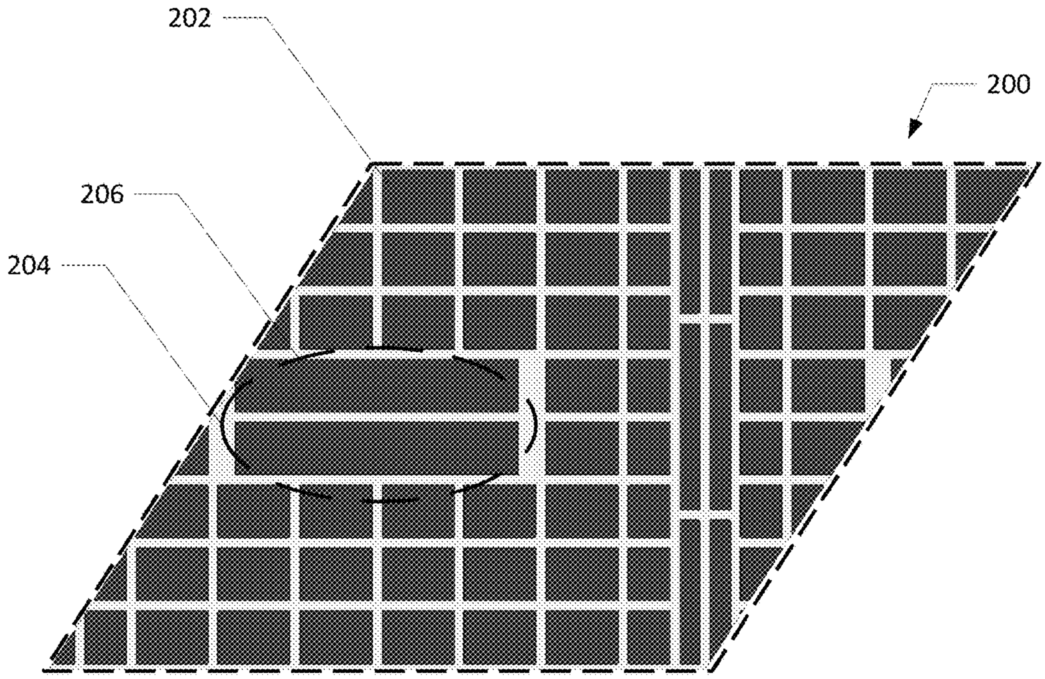
FIG. 2A is a top plan view of a top PCB metal layer of a radiating element as a unit cell according to various embodiments.

FIG. 2A is a top plan view of a top PCB metal layer of a radiating element as a unit cell according to various embodiments.

FIG. 2A illustrates a top PCB metal layer of a radiating element as a unit cell 200 including metal layer 202 (blue/dark portions in FIG. 2A) disposed on a substrate 204 (yellow/light portions in FIG. 2A).

Figure 2B:
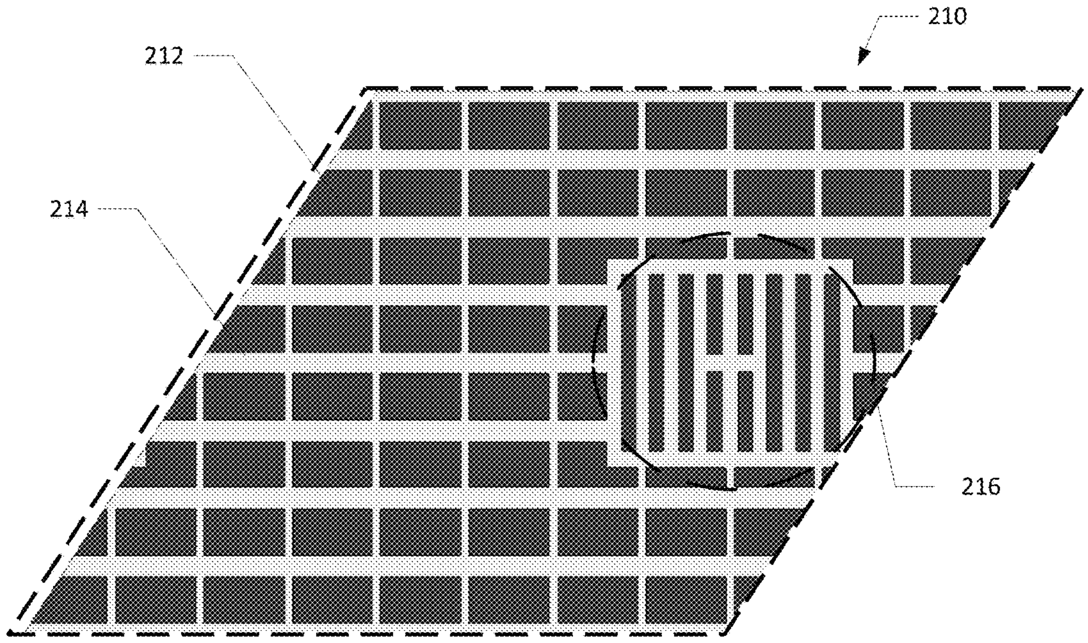
FIG. 2B is a top plan view of a mid PCB metal layer of a radiating element as a unit cell according to various embodiments.

FIG. 2B is a top plan view of a mid PCB metal layer of a radiating element as a unit cell according to various embodiments.

FIG. 2B illustrates a mid PCB metal layer of a radiating element as a unit cell 210 including metal layer 212 (blue/dark portions in FIG. 2B) disposed on a substrate 214 (yellow/light portions in FIG. 2A). The substrate 214 may have a high dielectric constant.

Figure 2C:
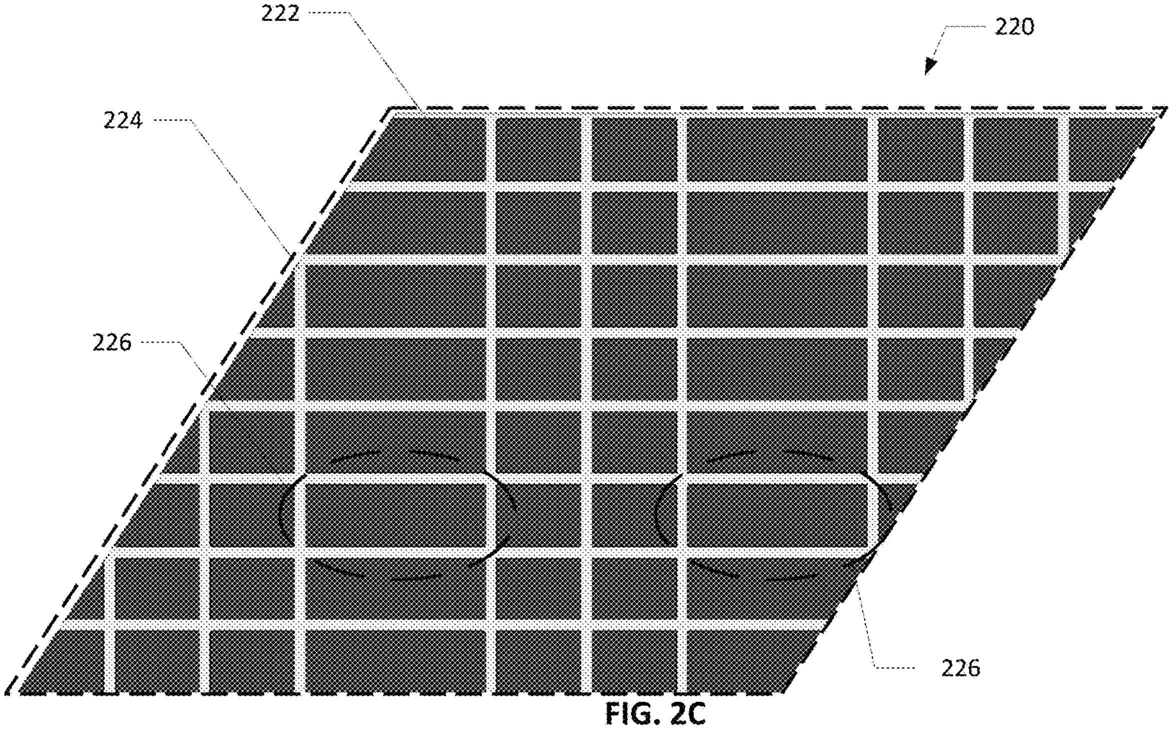
FIG. 2C is a top plan view of a low PCB metal layer of a radiating element as a unit cell according to various embodiments.

FIG. 2C is a top plan view of a low PCB metal layer of a radiating element as a unit cell according to various embodiments.

FIG. 2C illustrates a low PCB metal layer of a radiating element as a unit cell 220 including metal layer 222 (blue/dark portions in FIG. 2C) disposed on a substrate 224 (yellow/light portions in FIG. 2C). The substrate 224 may have a high dielectric constant.

Figure 2D:
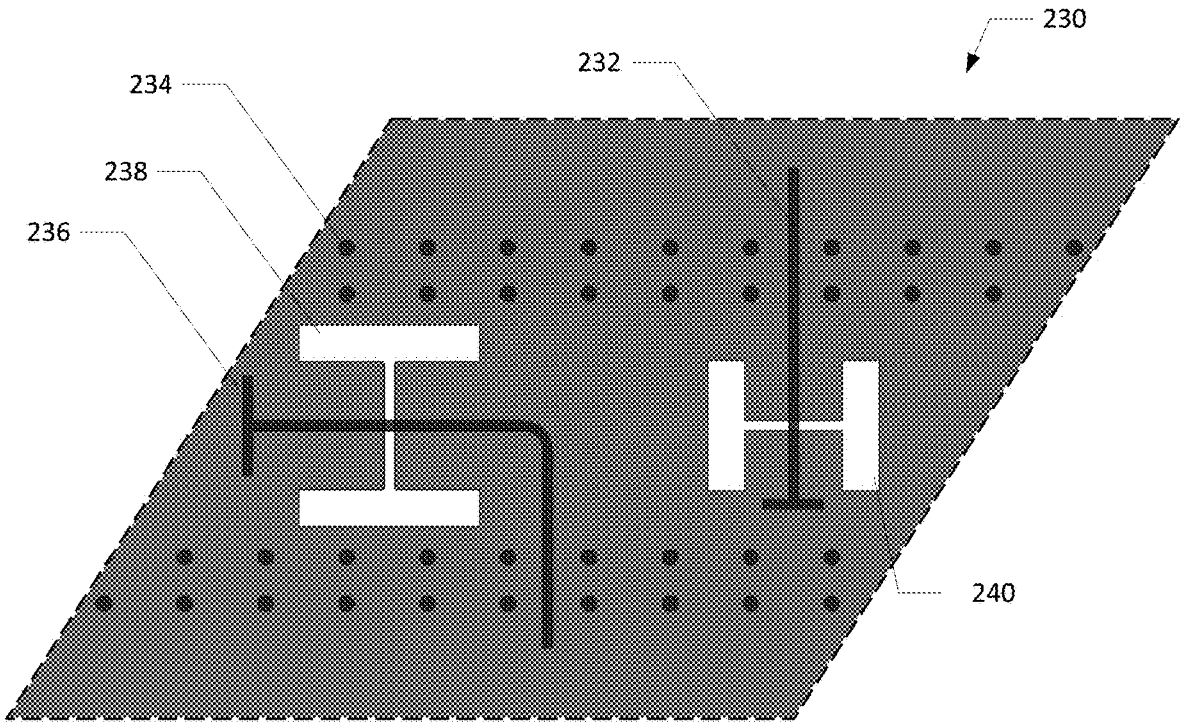
FIG. 2D is a top plan view of a ground plane layer 366 of a radiating element as a unit cell according to various embodiments.

FIG. 2D is a top plan view of a ground plane layer of a radiating element as a unit cell according to various embodiments.

FIG. 2D illustrates a ground plane layer of a radiating element as a unit cell 230 including a RX stripline feed 232 having no matching stubs. The RX stripline feed 232 may have a 50 ohm resistance. The unit cell 230 may include a TX stripline feed 236 having no matching stubs. The TX stripline feed 236 may have a 50 ohm resistance. The unit cell 230 may include ground vias 234. The unit cell 230 may include a horizontal polarization ground plane slot 238. The unit cell 230 may include a vertical polarization ground plane slot 240.

Figure 3:
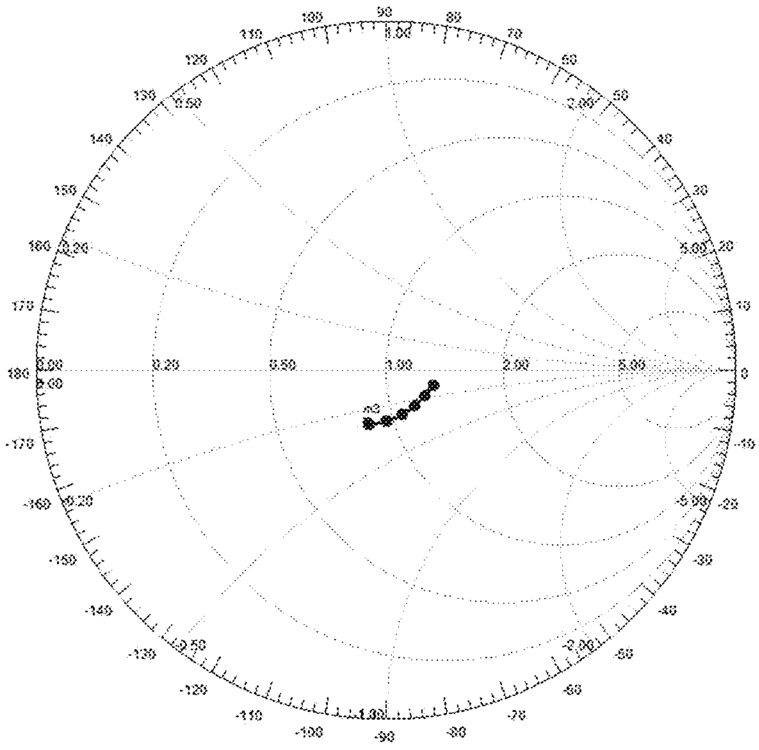
FIG. 3 is a graphical representation of the performance of a radiating element according to various embodiments.

FIG. 3 is a graphical representation of the performance of a radiating element according to various embodiments.

FIG. 3 illustrates a Smith plot of the return loss of a radiating element of the present teachings for frequency range of 14-14.5 GHz having a Theta of 45 degrees and phi of 56.97613 degrees.

Figure 4:
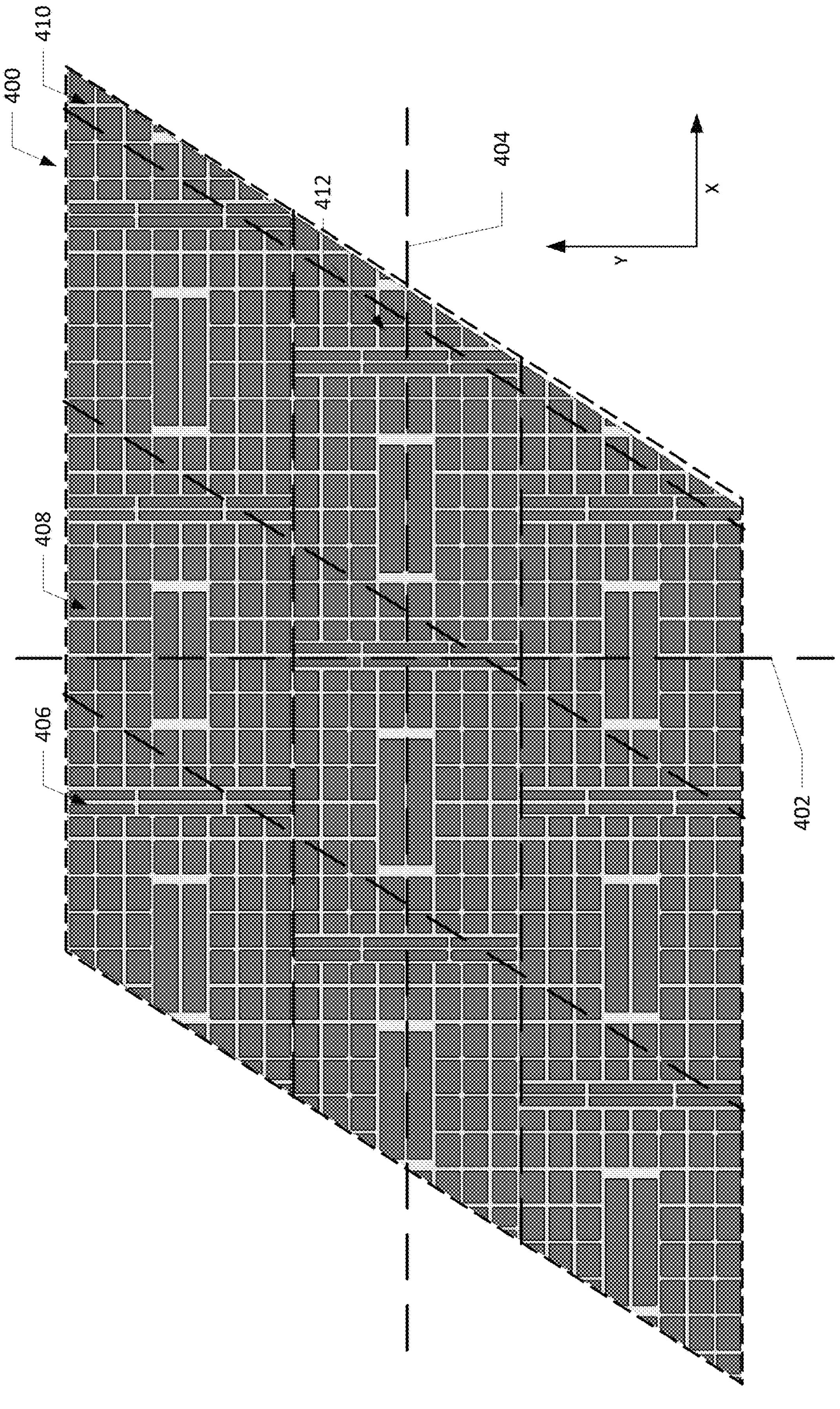
FIG. 4 illustrates a partial top-down view of an array of radiating elements disposed in a symmetrical rectangular lattice that constructively disposes the radiating elements in a non-equilateral triangular lattice according to various embodiments.

FIG. 4 illustrates a partial top-down view of an array of radiating elements disposed in a symmetrical rectangular lattice that constructively disposes the radiating elements in a non-equilateral triangular lattice according to various embodiments.

An array 400 including radiating elements 406, 408, 410, 412 may be symmetric about an X-axis 404. The array 400 including radiating elements 406, 408, 410, 412 may be symmetric about a Y-axis 402. The array 400 including radiating elements 406, 408, 410, 412 may be symmetric about the X-axis 404 and the Y-axis 402. The radiating elements 406, 408, 410, 412 may be constructively disposed in a non-equilateral triangle by skewing metal layers/components of the radiating elements 406, 408, 410, 412 in the X-direction or the Y-direction. Radiating elements 406, 408, 410, 412 may be disposed wholly in one quadrant (for example, radiating element 406), disposed in two quadrants (for example, radiating element 408), disposed in four quadrants (for example, radiating element 412), or the like. Some radiating elements may be partially formed and may not be used (for example, radiating element 410). Partially formed radiating elements along edges of the array 400 may be unused. An area of each of the radiating elements 406, 408, 410, 412 is greater than $0.25\lambda^2$, for example, $0.3125\lambda^2$. The symmetric design of array 400 improves performance: return loss, mutual coupling, and co-polarization.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

I claim as my invention:

1. A radiating element comprising:

Higher order Floquet Structure (HOFS) layers comprising a top PCB metal layer, a mid PCB metal layer, and a low PCB metal layer;

component layers comprising electronics to connect to the HOFS layers; and a unit cell constructively defined by the HOFS layers, wherein the unit cell is capable of operating as a transceiver, the unit cell has an operating range of 10.7 GHz to 14.5 GHZ, and an area of the unit cell is $0.3125\ \lambda^2$.

2. The radiating element of claim 1, wherein each of the top PCB metal layer, the mid PCB metal layer and the low PCB metal layer comprises a feature trace and gap widths of about 6 mils or greater.

3. The radiating element of claim 1, wherein each of the HOFS layers comprises a substrate having a dielectric constant ranging from 3.0 to 3.7.

4. The radiating element of claim 3, wherein the substrate comprises a Rogers 4835 material.

5. The radiating element of claim 3, wherein the substrate comprises a low loss FR-4 material.

6. The radiating element of claim 1, wherein the component layers and the HOFS layers are affixed to each other with an adhesive.

7. The radiating element of claim 1, wherein the unit cell is configured to operate with a scan angle θ from 0° to 50° and a o scan angle from 0° and 360°.

8. The radiating element of claim 1, wherein the component layers and the HOFS layers jointly have a cross-section depth between 100 mils and 450 mils.

9. The radiating element of claim 1, wherein the radiating element comprises a plurality of radiating elements and the plurality of radiating elements are disposed in a non-equilateral triangular lattice.

10. The radiating element of claim 9, wherein the plurality of radiating elements are formed by symmetrical metal layers about a vertical axis and a horizontal axis, and the symmetrical metal layers constructively form the non-equilateral triangular lattice.

11. The radiating element of claim 10, wherein each of the plurality of radiating elements is configured to operate with a scan angle θ from 0° to 50° and a φ scan angle from 0° and 360°.

12. The radiating element of claim 10, wherein each of the HOFS layers comprises a substrate having a dielectric constant ranging from 3.0 to 3.7.

13. An array comprising:

radiating elements, wherein each radiating element comprises:

Higher order Floquet Structure (HOFS) layers comprising a top PCB metal layer, a mid PCB metal layer, and a low PCB metal layer;

component layers comprising electronics to connect to the HOFS layers; and a unit cell constructively defined by the HOFS layers, wherein the unit cell is capable of operating as a transceiver, the unit cell has an operating range of 10.7 GHz to 14.5 GHZ, and an area of the unit cell is 0.3125 $\lambda^2$.

14. The array of claim 13, wherein each of the HOFS layers comprises a substrate having a dielectric constant ranging from 3.0 to 3.7.

15. The array of claim 14, wherein the substrate comprises a Rogers 4835 material.

16. The array of claim 14, wherein the substrate comprises a low loss FR-4 material.

17. The array of claim 13, wherein each of the component layers and the HOFS layers jointly have a cross-section depth between 100 mils and 450 mils.

18. The array of claim 13, wherein the radiating elements are disposed in a non-equilateral triangular lattice.

19. The array of claim 13, wherein the radiating elements are formed by symmetrical metal layers about a vertical axis and a horizontal axis, and the symmetrical metal layers constructively form the non-equilateral triangular lattice.

20. The radiating element of claim 13, wherein each of the radiating elements is configured to operate with a scan angle θ from 0° to 50° and a φ scan angle from 0° and 360°.

* * * * *